United States Patent
Lu et al.

(10) Patent No.: US 11,708,025 B2
(45) Date of Patent: *Jul. 25, 2023

(54) VEHICLE VISION SYSTEM WITH SMART CAMERA VIDEO OUTPUT

(71) Applicant: MAGNA ELECTRONICS INC., Auburn Hills, MI (US)

(72) Inventors: Yuesheng Lu, Farmington Hills, MI (US); Vivek Vaid, South Lyon, MI (US); Patrick A. Miller, Grand Blanc, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,402

(22) Filed: Sep. 2, 2022

(65) Prior Publication Data
US 2023/0001855 A1    Jan. 5, 2023

Related U.S. Application Data

(63) Continuation of application No. 15/421,483, filed on Feb. 1, 2017, now Pat. No. 11,433,809.

(60) Provisional application No. 62/290,168, filed on Feb. 2, 2016.

(51) Int. Cl.
*B60R 11/04* (2006.01)
*B60R 1/00* (2022.01)
*H04N 7/18* (2006.01)
*G06V 10/94* (2022.01)
*G06V 20/56* (2022.01)
*H04N 23/63* (2023.01)
(Continued)

(52) U.S. Cl.
CPC .............. *B60R 1/00* (2013.01); *G06V 10/955* (2022.01); *G06V 20/56* (2022.01); *H04N 7/181* (2013.01); *H04N 23/63* (2023.01); *H04N 23/90* (2023.01); *B60R 2300/30* (2013.01); *H04N 23/661* (2023.01)

(58) Field of Classification Search
CPC .... H04N 5/23293; H04N 5/262; H04N 7/181; H04N 9/09; H04N 9/646
See application file for complete search history.

(56) References Cited

U.S. PATENT DOCUMENTS

| | | |
|---|---|---|
| 4,987,357 A | 1/1991 | Masaki |
| 4,987,410 A | 1/1991 | Berman et al. |
| 4,991,054 A | 2/1991 | Walters |
| | (Continued) | |

*Primary Examiner* — Patrick E Demosky
(74) *Attorney, Agent, or Firm* — Honigman LLP

(57) ABSTRACT

A vehicular vision system includes at least one color camera disposed at a vehicle and having an image sensor operable to capture image data. A first system on chip (SoC) includes an image signal processor that receives captured image data and converts the received image data to converted data that is in a format suitable for machine vision processing. A second system on chip (SoC) receives captured image data and communicates display data to a display disposed in the vehicle, with the display data being in a format suitable for display of video images at the display. At startup of the vehicle, video images derived from the display data are displayed by the display within a time period following startup of the vehicle and machine vision data processing of converted data does not commence until after the display time period has elapsed following startup of the vehicle.

30 Claims, 3 Drawing Sheets

(51) Int. Cl.
*H04N 23/90* (2023.01)
*H04N 23/661* (2023.01)

(56) References Cited

U.S. PATENT DOCUMENTS

| | | |
|---|---|---|
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |

(56) References Cited

U.S. PATENT DOCUMENTS

| | | |
|---|---|---|
| 5,914,815 A | 6/1999 | Bos |
| 5,920,367 A | 7/1999 | Kajimoto et al. |
| 5,923,027 A | 7/1999 | Stam et al. |
| 5,938,810 A | 8/1999 | De Vries, Jr et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,990,469 A | 11/1999 | Bechtel et al. |
| 5,990,649 A | 11/1999 | Nagao et al. |
| 6,009,336 A | 12/1999 | Harris et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,097,024 A | 8/2000 | Stam et al. |
| 6,100,811 A | 8/2000 | Hsu et al. |
| 6,139,172 A | 10/2000 | Bos et al. |
| 6,144,022 A | 11/2000 | Tenenbaum et al. |
| 6,158,655 A | 12/2000 | DeVries, Jr. et al. |
| 6,175,300 B1 | 1/2001 | Kendrick |
| 6,201,642 B1 | 3/2001 | Bos |
| 6,222,460 B1 | 4/2001 | DeLine et al. |
| 6,226,061 B1 | 5/2001 | Tagusa |
| 6,243,003 B1 | 6/2001 | DeLine et al. |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,333,759 B1 | 12/2001 | Mazzilli |
| 6,359,392 B1 | 3/2002 | He |
| 6,370,329 B1 | 4/2002 | Teuchert |
| 6,396,397 B1 | 5/2002 | Bos et al. |
| 6,411,328 B1 | 6/2002 | Franke et al. |
| 6,424,273 B1 | 7/2002 | Gutta et al. |
| 6,430,303 B1 | 8/2002 | Naoi et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,693,524 B1 | 2/2004 | Payne |
| 6,700,605 B1 | 3/2004 | Toyoda et al. |
| 6,703,925 B2 | 3/2004 | Steffel |
| 6,704,621 B1 | 3/2004 | Stein et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,744,353 B2 | 6/2004 | Sjonell |
| 6,757,109 B2 | 6/2004 | Bos |
| 6,762,867 B2 | 7/2004 | Lippert et al. |
| 6,795,221 B1 | 9/2004 | Urey |
| 6,807,287 B1 | 10/2004 | Hermans |
| 6,823,241 B2 | 11/2004 | Shirato et al. |
| 6,824,281 B2 | 11/2004 | Schofield et al. |
| 6,847,487 B2 | 1/2005 | Burgner |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,133,661 B2 | 11/2006 | Hatae et al. |
| 7,149,613 B2 | 12/2006 | Stam et al. |
| 7,151,996 B2 | 12/2006 | Stein |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,375,803 B1 | 5/2008 | Bamji |
| 7,423,821 B2 | 9/2008 | Bechtel et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,755 B2 | 12/2010 | Weller et al. |
| 7,855,778 B2 | 12/2010 | Yung et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,508,350 B2 | 8/2013 | Nix et al. |
| 8,553,088 B2 | 10/2013 | Stein et al. |
| 8,814,401 B2 | 8/2014 | Higgins-Luthman et al. |
| 9,495,876 B2 | 11/2016 | Lu et al. |
| 9,508,014 B2 | 11/2016 | Lu et al. |
| 11,433,809 B2 | 9/2022 | Lu et al. |
| 2001/0002451 A1 | 5/2001 | Breed |
| 2002/0005778 A1 | 1/2002 | Breed et al. |
| 2002/0011611 A1 | 1/2002 | Huang et al. |
| 2002/0113873 A1 | 8/2002 | Williams |
| 2003/0103142 A1 | 6/2003 | Hitomi et al. |

(56) References Cited

U.S. PATENT DOCUMENTS

| | | |
|---|---|---|
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2011/0216201 A1 | 9/2011 | McAndrew et al. |
| 2012/0044351 A1 | 2/2012 | Kook |
| 2012/0045112 A1 | 2/2012 | Lundblad et al. |
| 2012/0069185 A1 | 3/2012 | Stein |
| 2012/0162427 A1* | 6/2012 | Lynam .................. H04N 23/698 348/148 |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0250114 A1 | 9/2013 | Lu |
| 2013/0286193 A1 | 10/2013 | Pflug |
| 2013/0314503 A1* | 11/2013 | Nix ........................ G06V 20/58 348/46 |
| 2014/0043473 A1 | 2/2014 | Gupta et al. |
| 2014/0063254 A1 | 3/2014 | Shi et al. |
| 2014/0085472 A1 | 3/2014 | Lu et al. |
| 2014/0098229 A1 | 4/2014 | Lu et al. |
| 2014/0139670 A1 | 5/2014 | Kesavan et al. |
| 2014/0152778 A1 | 6/2014 | Ihlenburg et al. |
| 2014/0168428 A1 | 6/2014 | Nefedov et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0340510 A1 | 11/2014 | Ihlenburg et al. |
| 2014/0347486 A1 | 11/2014 | Okouneva |
| 2014/0350834 A1 | 11/2014 | Turk |
| 2016/0191795 A1 | 6/2016 | Han et al. |
| 2016/0272118 A1 | 9/2016 | Kim et al. |
| 2017/0039084 A1 | 2/2017 | Atsmon et al. |
| 2017/0223269 A1 | 8/2017 | Fluegel |

* cited by examiner

VEHICLE VISION SYSTEM WITH SMART CAMERA VIDEO OUTPUT

CROSS REFERENCE TO RELATED APPLICATIONS

The present application is a continuation of U.S. patent application Ser. No. 15/421,483, filed Feb. 1, 2017, now U.S. Pat. No. 11,433,809, which claims the filing benefits of U.S. provisional application Ser. No. 62/290,168, filed Feb. 2, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle. The camera includes a first chip having a processor that receives captured image data (such as captured by an imager or imaging sensor of the camera) and processes the received captured image data for machine vision, wherein, responsive to image processing of the received captured image data, the first chip or processor generates an output for a driver assistance system of the vehicle. The camera includes a second chip or processor that receives the captured image data and that communicates video images to a display for viewing by the driver of the vehicle during normal operation of the vehicle.

The present invention thus provides a smart camera that can quickly (upon initial vehicle start up) provide video images for display to the driver of the vehicle, without having to wait for the machine vision processor to warm up and process the image data captured by the camera. The smart camera provides an output responsive to image processing of the captured image data for a vehicle driver assistance system, and also provides an output for displaying video images at a display of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
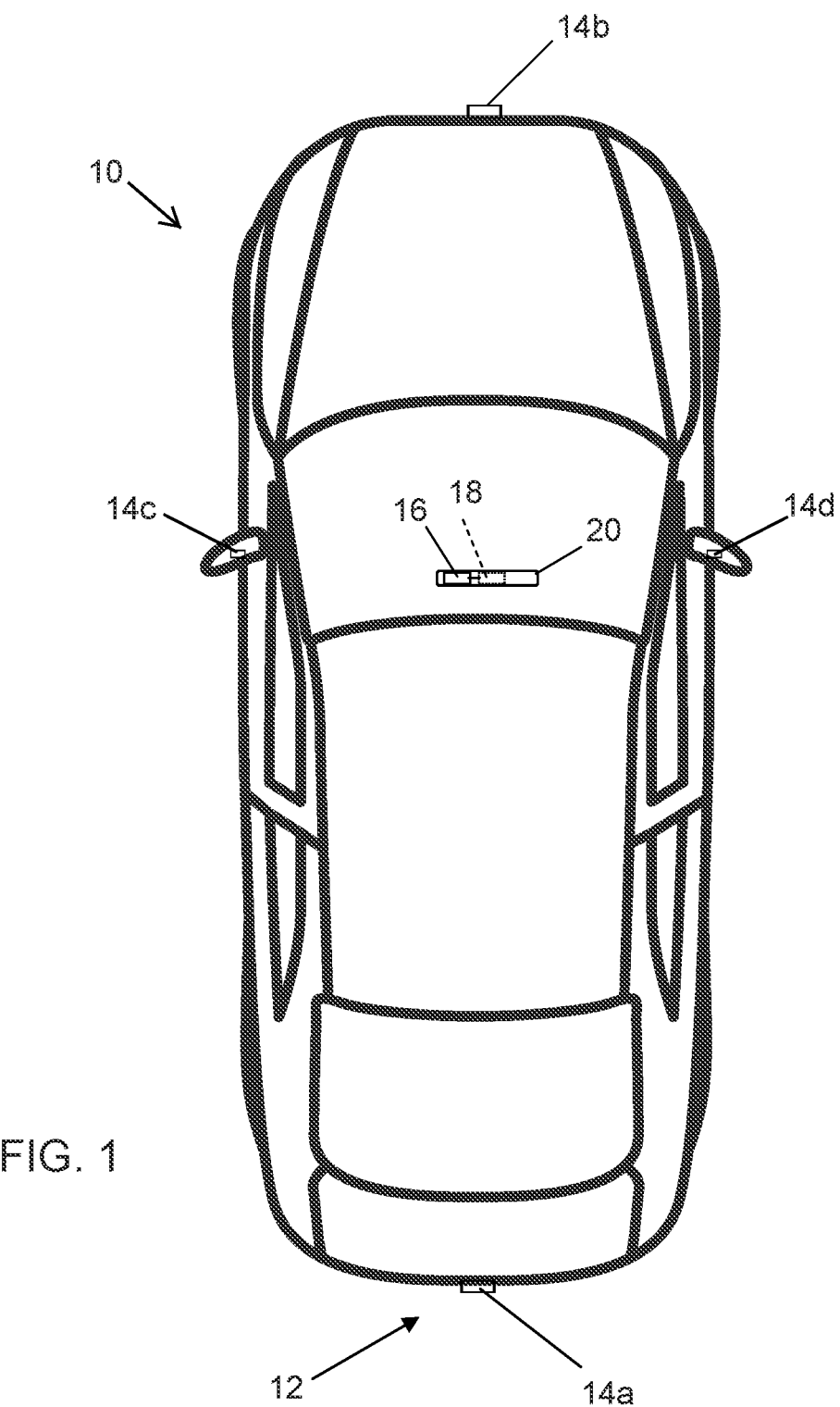
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a vision system that has a reduced video start-up time for smart camera applications. The system creates a high reliability video pipeline independent of a machine vision pipeline. Since video is considered a fundamental feature to be provided by a vehicle camera, the independence from complex software associated with machine vision and image processing creates inherent reliability for the video pipeline. The increased reliability in hardware allows for an enhanced safety critical system design. The present invention also improves the quality of the machine vision algorithm by avoiding the digital image manipulation that is applied to enhance human perception in a viewing application.

Figure 2:
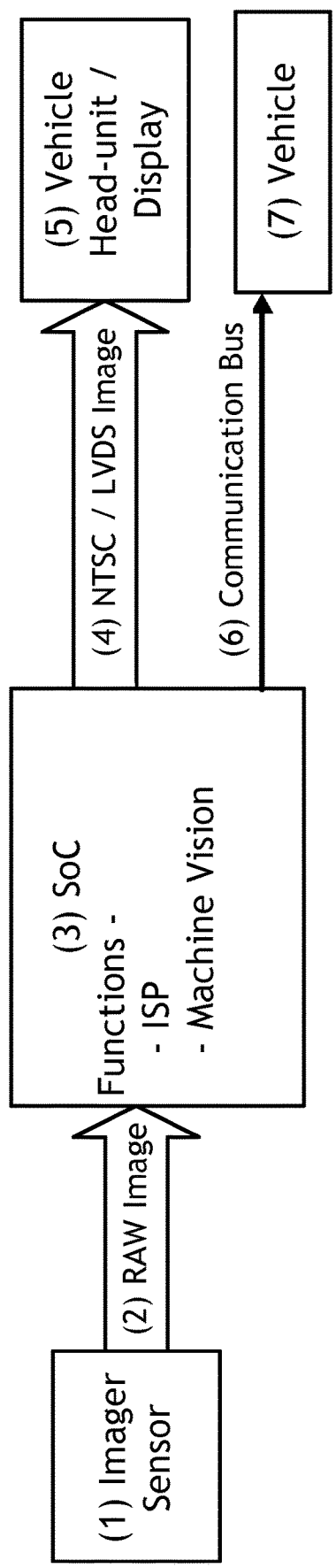
FIG. 2 is a block diagram of a known vision system.

The image sensor of a vision system captures image data to create an image of the environment, and outputs the captured image data (such as shown in FIG. 2). The image format could be many of the known formats (such as, for example, Bayer, RGB, YUV and/or the like). The system on chip (SoC) is responsible for machine vision. The SoC includes an ISP block (shown as ISP) to convert the raw image into a format suitable for machine vision algorithms as well as for display.

FIG. 2 shows the common implementation block diagram of a camera for a vehicle vision system. The input image, image processing (including both for viewing and for machine vision), and output image are in series. The drawback of such system is that there is a delay in video startup for the vehicle driver due to delay caused by software boot-up and initialization of the system on chip (SoC) 3. The SoC software is complicated and lengthy and thus the boot-time is long, however the vehicle driver expects the video from the vehicle camera 1 to be viewable (such as at a display 5) as soon as the vehicle 7 is switched on. There is a NHSTA requirement for video start-up time as well in FMVSS 111.

The output of the system on chip 3 includes the results of machine vision algorithms and status information for the vehicle (such as, for example, objects detected, location of pedestrians detected and any warnings) on a communication bus 6. The communication bus 6 may be any physical layer common in automotive industry (such as, for example, a CAN bus, LIN bus, Ethernet, I2C encoded on LVDS and/or the like).

The SoC 3 is also responsible for video output to vehicle display. It includes the ISP block which converts the raw video 2 to an output format suitable for display. This output to the display could be either NTSC or LVDS 4 or any other video format which can be sent to vehicle display.

For better human perception of displayed images, the system may apply digital sharpening, higher contrast and more saturated color in image signal processing (ISP) of captured image data for generating video images for the display. However, these changes sometimes pose challenges to machine vision algorithms that process the changed image data.

Figure 3:
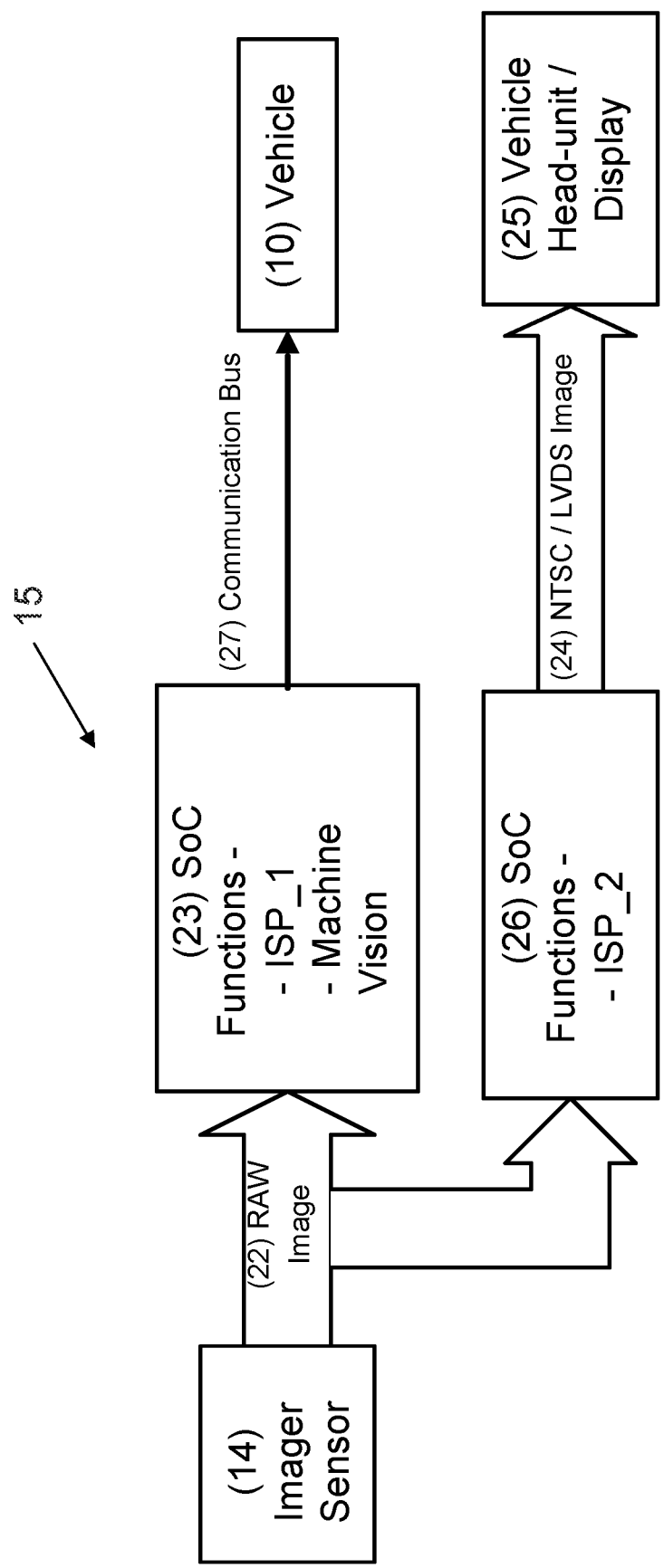
FIG. 3 is a block diagram of the vision system of the present invention.

As shown in FIG. 3, the system and smart camera of the present invention provides two chips 23, 26 for a smart camera 15 of an advanced driver assistance system (ADAS). The image sensor 14 captures image data and creates an image of the environment, and outputs it in an image format 22. The image format 22 may comprise any known formats (such as, for example, Bayer, RGB, YUV and/or the like). The first system on chip (SoC) 23 is responsible for machine vision and includes an independent ISP block (shown as ISP_1) to convert the image data into format suitable for machine vision algorithms (where the first SoC may perform further processing for machine vision systems or may communicate the converted image data to an image processor of a driver assistance system that processes the communicated converted image data (such as for object detection or lane marker detection or traffic sign recognition or the like). The second SoC 26 communicates the unconverted image data for display by the display screen for viewing by the driver of the vehicle.

The output 27 of the first SoC 23 includes the results of machine vision algorithms and status information for the vehicle (such as, for example, objects detected, location of pedestrians detected and any warnings).

The second SoC 26 is responsible for video output 24 to the vehicle display 25. The SoC 26 includes an ISP block (shown as ISP_2) tailored to convert raw video 22 to an output format suitable for display. The output of the second SoC 26 may comprise NTSC video or LVDS or any format which can be sent to vehicle display. Because the output of the second SoC is based on image data that is not processed for machine vision (by the first SoC 23), the second SoC may also apply digital sharpening, higher contrast and/or more saturated color in the image signal processing (ISP) of the captured image data for generating enhanced video images for the display.

The image format (in its as-captured format) for the image data communicated by the second SoC is uncompressed data directly output from the imager's array (such as a color Bayer pixelated array or the like) and may be any suitable format. The first SoC is responsible for machine vision (which processes converted data), while the second SoC communicates unprocessed image data (that may be converted to color space such as via, for example, RGB, YUV and/or the like) to the display system for display of video images. Both processors may be disposed at or may be part of the camera or may be remote from the camera, such as at a control of the vehicle or system.

Thus, the present invention provides two processors or chips that receive the raw image data captured by the imaging sensor or imaging array or imager of the camera, with one processor converting and/or processing the image data for machine vision functions (such as object detection or the like) and communicating an output to one or more vehicle systems (such as a backup assist system or adaptive cruise control system or headlamp control system or lane departure warning system or the like), and with the other processor providing video images for display at a display unit of the vehicle. Thus, the system and camera of the present invention provides for rapid display of video images when the vehicle is first turned on (such as when the ignition is initially turned to on or start), since the video images are not processed by the machine vision processor (which may still be warming up after video images are being displayed on the display screen). The present invention provides enhanced early display of video images, which is important at the onset of a reversing maneuver, so the driver can quickly see the displayed video images without having to wait for processing algorithms to "wake up" and start processing the raw image data to detect objects or the like.

The cameras may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor (SoC 23) may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or U.S. Publication Nos. US-2006-0061008; US-2006-0050018, and/or US-2012-0162427, which are hereby incorporated herein by reference in their entireties. The display may utilize aspects of the display systems described in U.S. Pat. No. 8,427,751 and/or U.S. Publication Nos. US-2014-0333729; US-2014-0139676; US-2015-0092042; US-2015-0232030 and/or US-2016-0209647, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a color camera disposed at a vehicle equipped with the vehicular vision system, the color camera viewing exterior of the vehicle, the color camera comprising an image sensor, wherein the color camera is operable to capture image data;
   wherein the image sensor has at least one million photosensor elements arranged in rows and columns, and wherein the color camera captures color image data via spectral filtering at the image sensor;
   a display disposed in the vehicle and operable to display video images for viewing by a driver of the vehicle during operation of the vehicle;
   an image data processing chip that comprises a first system on a chip (SoC) that includes an image signal processor that receives image data captured by the color camera and converts the received image data to converted data that is in a format suitable for machine vision processing;
   wherein the image data processing chip processes the converted data using machine vision data processing and, responsive to the machine vision data processing of the converted data, generates an output indicative of detection of a pedestrian present in a field of view of the color camera;
   wherein the output indicative of detection of the pedestrian is provided to a vehicle system of the vehicle;
   a video processing chip that comprises a second system on a chip (SoC) that receives image data captured by the color camera and communicates display data to the display, and wherein the display data is derived from received image data captured by the color camera, and wherein the display data is in a format suitable for display of video images at the display;
   wherein the display displays video images derived from the display data communicated from the video processing chip; and
   wherein, at startup of the vehicle, video images derived from the display data communicated from the video processing chip are displayed by the display within a time period following startup of the vehicle and machine vision data processing of converted data at the image data processing chip does not commence until after the display time period has elapsed following startup of the vehicle.

2. The vehicular vision system of claim 1, wherein the display data comprises video images derived from image data as captured by the color camera.

3. The vehicular vision system of claim 2, wherein the video images are communicated to the display upon startup of the vehicle while the first SoC is booting up and not yet able to process the converted data.

4. The vehicular vision system of claim 1, wherein the video processing chip converts the received image data captured by the color camera to the format suitable for display of video images at the display.

5. The vehicular vision system of claim 4, wherein the display data communicated by the video processing chip is derived from captured image data that is not processed by the image data processing chip.

6. The vehicular vision system of claim 5, wherein the video processing chip applies digital sharpening, enhanced contrast and enhanced saturated color to the captured image data for generating enhanced video images for the display.

7. The vehicular vision system of claim 1, wherein the color camera disposed at the equipped vehicle is one of a plurality of color cameras disposed at the vehicle.

8. The vehicular vision system of claim 1, wherein the color camera comprises the image data processing chip and the video processing chip.

9. The vehicular vision system of claim 1, wherein the color camera comprises a rear backup camera disposed at a rear portion of the vehicle.

10. The vehicular vision system of claim 1, wherein the color camera comprises a forward viewing camera disposed at a windshield of the vehicle and viewing forward of the vehicle through the windshield.

11. The vehicular vision system of claim 1, wherein the display data is communicated by the video processing chip to the display via low-voltage differential signaling (LVDS).

12. The vehicular vision system of claim 1, wherein the output of the image data processing chip is provided to the vehicle system of the vehicle via a communication bus of the vehicle.

13. The vehicular vision system of claim 1, wherein the vehicle system of the vehicle comprises a backup assist system of the vehicle.

14. The vehicular vision system of claim 1, wherein the vehicle system of the vehicle comprises an adaptive cruise control system of the vehicle.

15. A vehicular vision system, the vehicular vision system comprising:
a color camera disposed at a vehicle equipped with the vehicular vision system, the color camera viewing exterior of the vehicle, the color camera comprising an image sensor, wherein the color camera is operable to capture image data;
wherein the image sensor has at least one million photo-sensor elements arranged in rows and columns, and wherein the color camera captures color image data via spectral filtering at the image sensor;
a display disposed in the vehicle and operable to display video images for viewing by a driver of the vehicle during operation of the vehicle;
an image data processing chip that comprises a first system on a chip (SoC) that includes an image signal processor that receives image data captured by the color camera and converts the received image data to converted data that is in a format suitable for machine vision processing;
wherein the image data processing chip processes the converted data using machine vision data processing and, responsive to the machine vision data processing of the converted data, generates an output indicative of detection of a pedestrian present in a field of view of the color camera;
wherein the output indicative of detection of the pedestrian is provided to a vehicle system of the vehicle via a communication bus of the vehicle;
a video processing chip that comprises a second system on a chip (SoC) that receives image data captured by the color camera and communicates display data to the display, and wherein the display data is derived from received image data captured by the color camera, and wherein the display data is in a format suitable for display of video images at the display;
wherein the display data is communicated by the video processing chip to the display via low-voltage differential signaling (LVDS);
wherein the display displays video images derived from the display data communicated from the video processing chip; and
wherein, at startup of the vehicle, video images derived from the display data communicated from the video processing chip are displayed by the display within a time period following startup of the vehicle and machine vision data processing of converted data at the image data processing chip does not commence until after the display time period has elapsed following startup of the vehicle.

16. The vehicular vision system of claim 15, wherein the display data communicated by the video processing chip is derived from captured image data that is not processed by the image data processing chip.

17. The vehicular vision system of claim 15, wherein the video processing chip applies digital sharpening, enhanced contrast and enhanced saturated color to the captured image data for generating enhanced video images for the display.

18. The vehicular vision system of claim 15, wherein the color camera disposed at the equipped vehicle is one of a plurality of color cameras disposed at the vehicle.

19. The vehicular vision system of claim 15, wherein the color camera comprises a rear backup camera disposed at a rear portion of the vehicle.

20. The vehicular vision system of claim 15, wherein the color camera comprises a forward viewing camera disposed at a windshield of the vehicle and viewing forward of the vehicle through the windshield.

21. The vehicular vision system of claim 15, wherein the vehicle system of the vehicle comprises a backup assist system of the vehicle.

22. The vehicular vision system of claim 15, wherein the vehicle system of the vehicle comprises an adaptive cruise control system of the vehicle.

23. A vehicular vision system, the vehicular vision system comprising:
a color camera disposed at a vehicle equipped with the vehicular vision system, the color camera viewing exterior of the vehicle, the color camera comprising an image sensor, wherein the color camera is operable to capture image data;
wherein the image sensor has at least one million photo-sensor elements arranged in rows and columns, and wherein the color camera captures color image data via spectral filtering at the image sensor;
a display disposed in the vehicle and operable to display video images for viewing by a driver of the vehicle during operation of the vehicle;
an image data processing chip that comprises a first system on a chip (SoC) that includes an image signal processor that receives image data captured by the color camera and converts the received image data to converted data that is in a format suitable for machine vision processing;
wherein the image data processing chip processes the converted data using machine vision data processing and, responsive to the machine vision data processing of the converted data, generates an output indicative of detection of a pedestrian present in a field of view of the color camera;

wherein the output indicative of detection of the pedestrian is provided to a vehicle system of the vehicle;

a video processing chip that comprises a second system on a chip (SoC) that receives image data captured by the color camera and converts the received image data to display data that is in a format suitable for display of video images at the display, and wherein the display data is communicated to the display;

wherein the display displays video images derived from the display data communicated from the video processing chip;

wherein, at startup of the vehicle, video images derived from the display data communicated from the video processing chip are displayed by the display within a time period following startup of the vehicle and machine vision data processing of converted data at the image data processing chip does not commence until after the display time period has elapsed following startup of the vehicle; and wherein the display data is communicated to the display upon startup of the vehicle while the first SoC is booting up and not yet able to process the converted data.

24. The vehicular vision system of claim 23, wherein the display data communicated by the video processing chip is derived from captured image data that is not processed by the image data processing chip.

25. The vehicular vision system of claim 23, wherein the video processing chip applies digital sharpening, enhanced contrast and enhanced saturated color to the captured image data for generating enhanced video images for the display.

26. The vehicular vision system of claim 23, wherein the color camera disposed at the equipped vehicle is one of a plurality of color cameras disposed at the vehicle.

27. The vehicular vision system of claim 23, wherein the color camera comprises a rear backup camera disposed at a rear portion of the vehicle.

28. The vehicular vision system of claim 23, wherein the color camera comprises a forward viewing camera disposed at a windshield of the vehicle and viewing forward of the vehicle through the windshield.

29. The vehicular vision system of claim 23, wherein the vehicle system of the vehicle comprises a backup assist system of the vehicle.

30. The vehicular vision system of claim 23, wherein the vehicle system of the vehicle comprises an adaptive cruise control system of the vehicle.

* * * * *